United States Patent [19]

Guinta et al.

[11] Patent Number: 5,083,814
[45] Date of Patent: Jan. 28, 1992

[54] SECURITY METHOD WITH APPLIED INVISIBLE SECURITY CODE MARKINGS

[75] Inventors: Robert R. Guinta, Woodcliff Lake, N.J.; Lewis Barton, New York, N.Y.; Peter M. Gandolfo, Southport, Conn.; John J. Mullins, Chester, N.Y.

[73] Assignee: SMS Group Inc., Tarrytown-on-Hudson, N.Y.

[21] Appl. No.: 675,660

[22] Filed: Mar. 27, 1991

[51] Int. Cl.⁵ .............................................. B42D 15/00
[52] U.S. Cl. .......................................... 283/70; 283/72; 283/74; 283/85; 283/91; 40/910; 40/911; 40/912; 101/483
[58] Field of Search .................... 283/70, 72, 74, 85, 283/91; 40/910, 911, 912; 101/483

[56] References Cited

U.S. PATENT DOCUMENTS

| | | | |
|---|---|---|---|
| 883,778 | 4/1908 | Boyle | 283/70 |
| 1,372,036 | 3/1921 | Olsen | 283/70 |
| 1,423,763 | 7/1952 | Gelnaw | 283/70 |
| 1,443,383 | 1/1923 | Reckleff et al. | 283/70 |
| 1,467,961 | 9/1923 | Tibbetts | 283/70 |
| 1,516,547 | 11/1924 | Powell | 40/631 |
| 1,556,895 | 10/1925 | Ayers | 283/74 |
| 2,192,860 | 3/1940 | Bennett et al. | 283/90 |
| 2,907,586 | 10/1959 | Paxton et al. | 283/90 |
| 3,643,358 | 2/1972 | Morderosian | 40/629 |
| 4,239,261 | 12/1980 | Richardson | 283/74 |
| 4,243,734 | 1/1981 | Dillon | 430/8 |
| 4,271,352 | 6/1981 | Thomas | 235/375 |
| 4,336,754 | 6/1982 | Loeb | 101/127 |
| 4,368,979 | 1/1983 | Ruell | 40/911 |
| 4,557,693 | 12/1985 | Elggren | 283/70 |
| 4,591,707 | 5/1986 | Stenzel et al. | 283/83 |
| 4,614,366 | 9/1986 | North et al. | 283/70 |
| 4,650,219 | 3/1987 | Sigman | 283/70 |
| 4,763,928 | 8/1988 | Krietemeier et al. | 283/70 |
| 4,765,655 | 8/1988 | Crihan | 283/70 |
| 4,889,365 | 12/1989 | Chouinard | 283/70 |

Primary Examiner—P. W. Echols
Assistant Examiner—David P. Bryant
Attorney, Agent, or Firm—Scully, Scott, Murphy & Presser

[57] ABSTRACT

An antitheft security system is disclosed for automotive, marine, and other valuable personal articles such as objects of art and valuable collectible objects. A dealer/installer is provided with equipment comprising a main unit having a memory, a keyboard for data entry, and a visual screen for monitoring the data entry procedure and also for displaying to the dealer the precise locations on the article where it is to be marked. The unit randomly selects different marking locations on the article by calling up form its memory a programmed universe of several hundred possible marking sites for each particular type of item. An image of the item is displayed on the visual screen, which indicates the exact location where each marking is to be made. The security codes are applied by a portable hand-held marking head containing an electrostatic, noncontact ink jet spraying nozzle which invisibly microprints a unique, classified security code in a dot matrix format of alphanumeric characters onto the surface. After the marking is completed, the unit transmits the subscriber information, confidential registration code, and coordinates of all markings to a limited access national data base. The local dealer machine then automatically erases from its memory all confidential information pertaining to the transaction. The authorities will be cooperated with in any case of theft by providing the coordinates of all marked locations, as well as the unique registration number printed on the item, thereby allowing positive identification of either an intact item, or any one of its marked, dismembered parts.

15 Claims, 3 Drawing Sheets

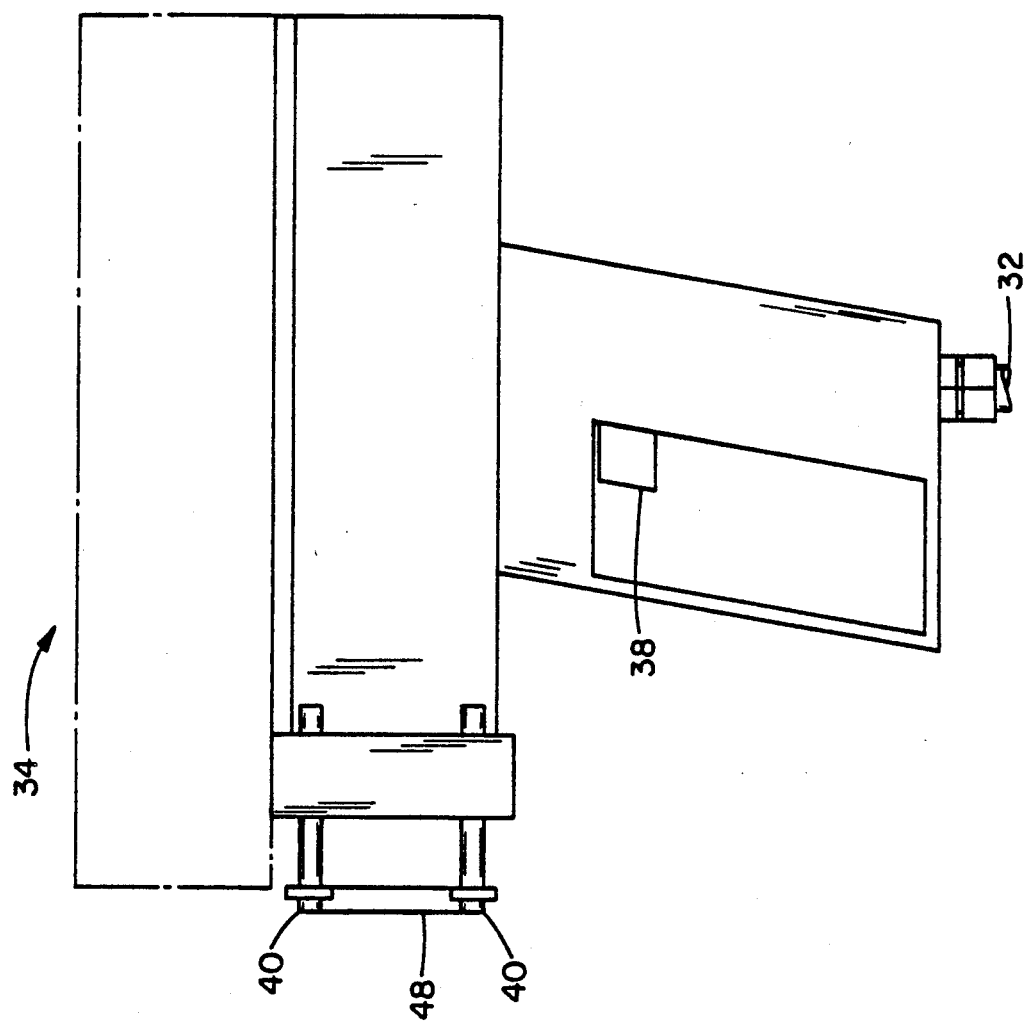
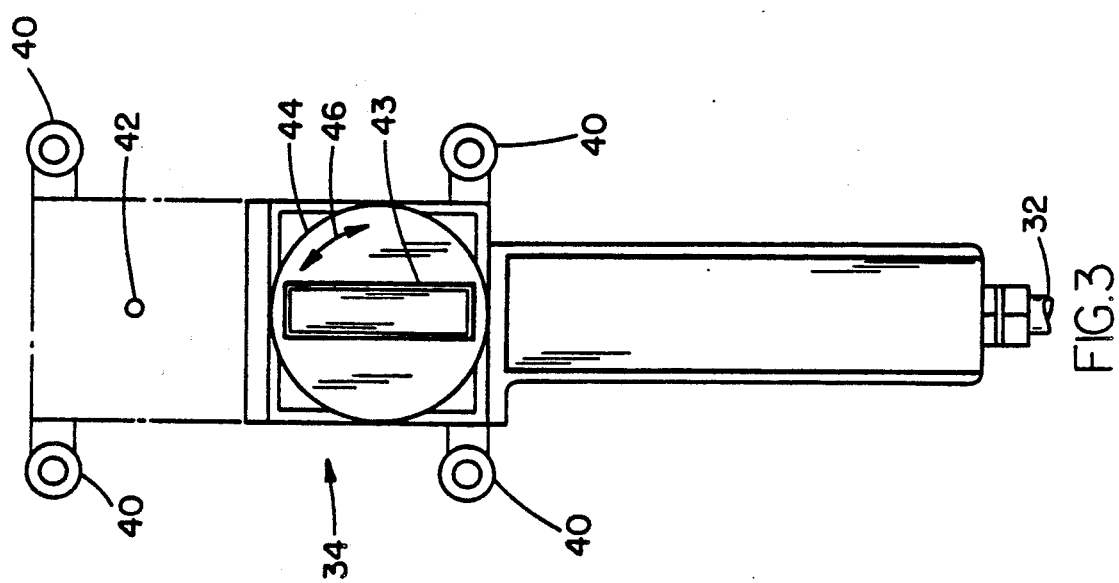

SECURITY METHOD WITH APPLIED INVISIBLE SECURITY CODE MARKINGS

BACKGROUND OF THE INVENTION

1. Field of the Invention

The present invention relates generally to a security method or system based upon the application of invisible security code markings to property protected thereby. More particularly, the subject invention pertains to an antitheft security system for automotive, marine, and other valuable personal articles such as objects of art and valuable collectible objects based upon a method involving the multiple and redundant application to each article, and limited access cataloging, of invisible, indelible registration code markings unique to each property owner.

2. Discussion of the Prior Art

The theft of goods such as automobiles, boats and marine equipment, objects of art, and collectibles has been a long-standing problem in society, and the prior art is replete with many approaches to avoid or deter theft, such as by marking or by placing identification markers on articles which may be subject to theft, either openly or in secret locations, such as disclosed in U.S. Pat. Nos. 883,778; 1,372,036; 1,443,383; 1,467,961; 1,556,895; 2,907,586; 3,643,358; 4,239,261; 4,243,734; 4,336,754; 4,591,707; 4,763,928, or with markings that are not normally visible, such as disclosed in U.S. Pat. Nos. 2,192,860 and 4,765,655. Moreover, a central office or records keeping file is sometimes maintained to keep records of markings, serial numbers, etc. to aid in the identification of recovered stolen property, such as disclosed in U.S. Pat. Nos. 1,423,763; 4,271,352 and 4,650,219. However, the prior art has not disclosed or suggested a comprehensive antitheft security system similar to that of the subject invention.

SUMMARY OF THE INVENTION

Accordingly, it is a primary object of the present invention to provide an antitheft security system for automotive, marine, and other valuable personal articles, such as objects of art and valuable collectible objects, based upon a method involving the multiple and redundant application to an article, and limited access cataloging, of invisible, indelible registration code markings unique to each subscriber/property owner. In greater detail, a particular unique registration code is assigned, and the marking locations are randomly selected from a computer data base, and all information relating thereto is transferred to a central data base for access only by authorized persons, and all confidential local records relating to the registration code and the particular locations of application thereof are erased.

In accordance with the teachings herein, the present invention provides a security method for applying invisible security markings to articles such as automobiles, boating equipment, objects of art and collectibles. Initially, a dealer/installer is supplied with equipment comprising a unit having a computer with an associated keyboard for data entry, and a visual screen for monitoring the data entry procedure and also for displaying the precise locations on an article where it is to be marked with invisible security markings. Moreover, the unit has a memory programmed with sets of many possible marking sites for different particular types of articles. The dealer is also supplied with a hand-held marking unit which is coupled by a conduit to a codebox unit which is coupled to and controlled by the local computer.

For each transaction, the dealer/installer records and inputs data necessary to institute a subscription to the security system, such as a subscriber's name, address, description of the article to be protected, manufacturer serial number of the article, the insurance carrier providing insurance coverage on the article, etc. Upon completion of the data entry phase, the unit randomly selects different locations on the article to which invisible security markings are to be applied. The unit does this by reading from its memory a programmed set of possible marking locations for the particular type of article, and then randomly selects a number of particular locations, which are selected randomly from article to article. The unit instructs the dealer/installer on the precise locations where the article is to be marked by displaying those locations on the display screen. The visual screen of the unit displays the position coordinates of each selected marking location, and the coordinates are cross indexed to a master grid superimposed on an image of the article displayed on the screen, to indicate the precise locations where the invisible security markings are to be applied. The unit also covertly assigns, without disclosure to either dealer/installer or subscriber, a unique and confidential registration code which is to be applied to all selected locations on the article.

The dealer/installer then applies the registration code to the selected locations on the article by a hand-held marking unit with markings which are normally invisible to the human eye. After the invisible security markings are applied to the article, the subscriber information, confidential registration code, and coordinates of all invisible security markings are transferred to a limited-access central data base, and the memory of the unit at the dealer/installer is erased regarding confidential information pertaining to the registration code and the precise locations where the registration code has been applied to the article. Moreover, after installation one or more visible warninq emblems can be placed on the article to clearly alert a potential thief that the article is protected by a security system, and can be positively identified even if disassembled.

In a preferred embodiment, the central database software, upon electronic receipt and acceptance of a new subscriber, will issue two (and only two) adhesive warning emblems. Each of the two labels shall be customized by indelibly printing the vehicle's identification number (VIN) into a blank area reserved on the emblem, thereby making these labels unique and specific to that particular vehicle, and thereby nontransferable. Further, the two emblems will be delivered to the subscriber in a fashion that will require the subscriber to sign for their receipt, along with printed instructions for their placement on the vehicle. This procedure is designed to prevent the issuance of unauthorized labels to anyone claiming nonreceipt. The registered limited edition emblems are produced and distributed in a manner to thwart potential counterfeiting, and allows for an instant visual cross checking of the VIN number on the emblem to the VIN number applied to the vehicle by the manufacturer. Replacement emblems can be provided to a subscriber in a legitimate case of destruction of the original label(s).

In greater detail, in a preferred embodiment the registration code is applied by a portable hand-held marking head containing an electrostatic, noncontact ink jet spraying nozzle. In operation, the print head is passed over the surface to be marked, and the device invisibly prints the unique, confidential registration code in a dot matrix format of alphanumeric characters on the surface. The registration code is preferably applied with a clear, ethanol based ink, which when applied is invisible to the naked eye, although other types of invisible inks or paints can be utilized in alternative embodiments.

Access to the classified information contained in the central data base will be made available only to authorized law enforcement and insurance authorities to aid in the positive identification of suspected stolen articles. The agencies can retrieve the invisible registration code from the property by means of a portable battery powered device that will be made available to them. In any case of theft, the authorities will be provided with the coordinates of all marked locations, as well as the unique registration code printed on the article, thereby allowing positive identification of either an intact article, or any one of its marked, disassembled parts. The portable battery powered device illuminates the invisible registration code markings with actinic radiation to render them visible to the human eye.

The security system provides a three stage benefit to a subscriber: (1) reduction of comprehensive insurance costs, (2) theft deterrence, and (3) a positive method of identification for law enforcement and insurance authorities in cases of theft which involve the alteration or eradication of the item's manufacturer applied serial number. Subscription to the system will be made available to the general public, corporations, private institutions, and governmental agencies through a network of authorized dealers.

BRIEF DESCRIPTION OF THE DRAWINGS

The foregoing objects and advantages of the present invention for a security method with applied invisible security code markings may be more readily understood by one skilled in the art with reference being had to the following detailed description of several preferred embodiments thereof, taken in conjunction with the accompanying drawings, in which:

FIGS. 3 and 4 are respectively front and side elevational views of one designed embodiment of a hand-held marking unit.

DETAILED DESCRIPTION OF THE DRAWINGS

Figure 1:
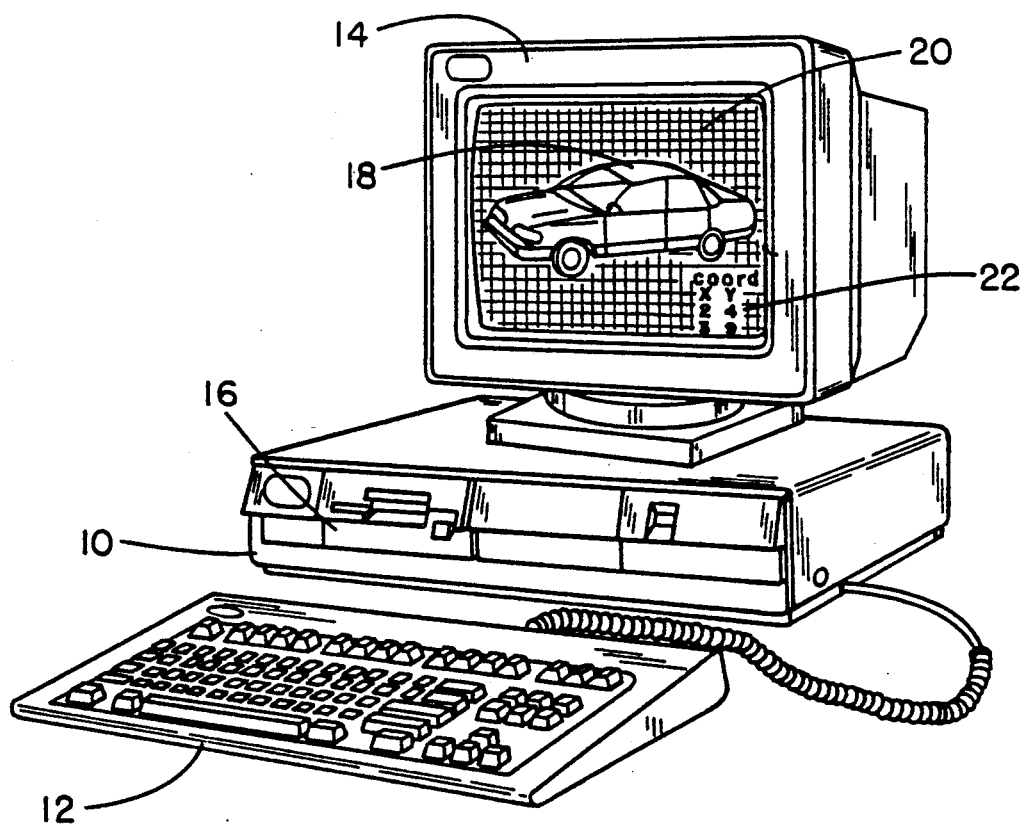
FIG. 1 is a schematic view of an exemplary embodiment of data entry and display screen equipment supplied to a dealer/installer, comprising a unit having a memory, a keyboard for data entry, and a visual screen for monitoring the data entry procedure and also for displaying the locations on an article where it is to be marked with invisible security markings.

The present invention contemplates a nationwide network of authorized dealers for providing a service of applying invisible security code markings to a customer's property such as an automobile or other article by specialized display, selection and marking equipment supplied to the dealer/installer. The equipment supplied to the dealer has the following capabilities:

(1) input data necessary to institute a subscription to the security system. Typically, this information is the subscriber's name, address, description of article to be protected, manufacturer serial numbering of the item, etc.;

(2) provide a physical configuration of the item and randomly select different locations on (or in) the article to which the invisible markings are to be applied. The number of locations and the particular selected locations are random from item to item;

(3) instruct the dealer/installer exactly where to mark the item for all markings;

(4) covertly create, without disclosure to either dealer or subscriber, a unique alphanumeric registration code which is applied to all selected locations on the article;

(5) allow the dealer/installer to apply the code to the selected locations with a hand-held marking head with an ink or paint which is normally invisible to the human eye;

(6) confidentially transmit the code, marked locations, and subscriber data electronically to a limited access national archives for storage; and (7) erase from its memory all confidential information pertaining to the transaction such as the particular registration code and the selected locations on the article at which the registration code has been applied.

Referring to the drawings in detail, each dealer/installer of a contemplated national network of dealers is supplied with equipment comprising a main unit 10 having a computer with an associated keyboard 12 for data entry, and a visual screen 14, preferably a color monitor, for monitoring the data entry procedure, and also for displaying to the dealer the precise locations on the article where it is to be marked. For each transaction, the dealer/installer records and inputs data necessary to institute a subscription to the security system, such as a subscriber's name, address, description of the article to be protected, manufacturer serial number of the article, the insurance carrier providing insurance coverage on the article, etc.

Upon completion of the data entry phase by the dealer, the unit randomly selects a number of different locations on the article for marking. The machine unit makes this random selection by calling up from its memory, such as a diskette memory 16, a preprogrammed universe of several hundred possible marking sites for each particular type of item. The visual screen on the unit then displays an image of the particular type of item, illustrated as an automobile 18 in FIG. 1, on a background of a master grid 20, and also provides a display at 22 of the precise coordinates to the installer for each selected marking location. These coordinates are cross indexed to the master grid 20 of the item displayed on the visual screen which indicates to the dealer the exact location where each marking should be made. The unit also covertly assigns, without disclosure to either dealer/installer or subscriber, a unique and confidential registration code which is to be applied to all selected locations on the article.

In alternative embodiments, the dealer/installer can be advised by instructions on the display screen of the precise marking locations, such as: left front fender, under wheel well, above left front tire; or for a painting, on the rear side, upper left corner, etc.

Figure 2:
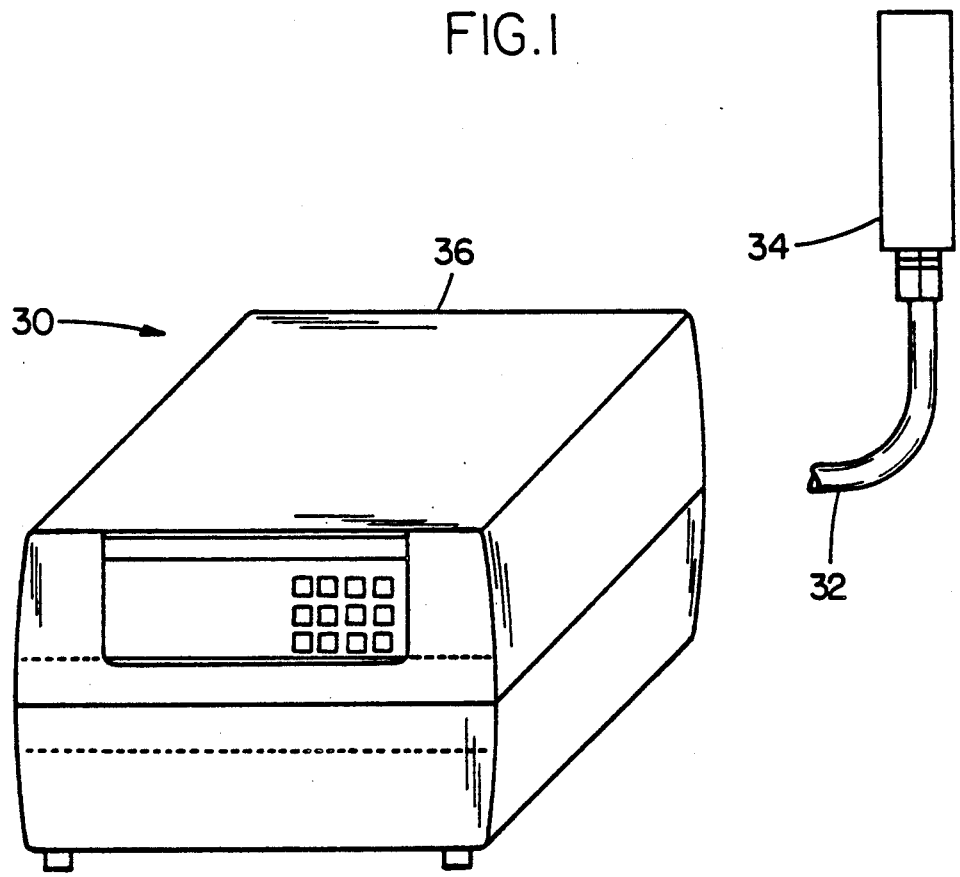
FIG. 2 illustrates a schematic view of a codebox unit connected by a conduit to a portable hand-held marking unit which is preferably used to apply invisible security markings to articles.

FIG. 2 illustrates a schematic view of a codebox unit 30 connected by a conduit 32 to a portable hand-held marking unit 34, illustrated schematically in FIG. 2, which is also supplied to the dealer and is used to apply invisible security markings to an article. The codebox unit 30 includes a reservoir for the marking ink and electronics to run the marking unit, such that the conduit 32 supplies marking ink to the marking unit therethrough, and electrical control signals are carred in both directions through the conduit. The codebox unit 30 is coupled by an electrical cable 36 to the local computer, which controls the codebox unit 30 and the marking unit 34 through electrical cable 36 and electrical connections in conduit 32. The marking unit 34 preferably comprises a portable hand-held marking head with an electrostatic, noncontact ink jet spraying nozzle, as illustrated in more detail in FIGS. 3 and 4. When the print head is passed over the surface to be marked, the device invisibly microprints the unique, classified security code in a dot matrix format of alphanumeric characters onto the surface. The code is entered directly from the main unit 10, such that it remains unknown to both the dealer and subscriber. The marking head applies the invisible security codes with a clear ink or paint, such as an ethanol based ink, which when applied is invisible to the naked eye. For surfaces exposed to outdoor conditions (such as the exterior or an automotive vehicle), the ink is selected to be a type which is substantially impervious to normal environmental conditions.

The unit 10 transmits the subscriber information, confidential registration code, and coordinates of all markings to a limited access national data base, through either on-line or store-and-forward electronic techniques. The local dealer machine then automatically erases from its memory all confidential information pertaining to the transaction such as the particular security code and the precise locations of the markings. One or more visible warning emblems can then be placed on the item to alert a potential thief that the item is protected by a security system and can be identified even if disassembled into parts.

In a preferred embodiment, the central database software, upon electronic receipt and acceptance of a new subscriber, will issue two (and only two) adhesive warning emblems. Each of the two labels shall be customized by indelibly printing the vehicle's identification number (VIN) into a blank area reserved on the emblem, thereby making these labels unique and specific to that particular vehicle, and thereby nontransferable. Further, the two emblems will be delivered to the subscriber in a fashion that will require the subscriber to sign for their receipt, along with printed instructions for their placement on the vehicle. This procedure is designed to prevent the issuance of unauthorized labels to anyone claiming nonreceipt. The registered limited edition emblems are produced and distributed in a manner to thwart potential counterfeiting, and allows for an instant visual cross checking of the VIN number on the emblem to the VIN number applied to the vehicle by the manufacturer. Replacement emblems can be provided to a subscriber in a legitimate case of destruction of the original label(s).

Once received and processed by the central data base computer, the subscriber then receives a written confirmation that his subscription is in full effect, and that he may, in case of theft, correctly identify to the authorities that the stolen article has been registered in a discreet marking security program.

The authorities will be cooperated with in any case of theft by providing the coordinates of all marked locations, as well as the unique registration number printed on the item, allowing positive identification of either an intact item, or any one of its marked, dismembered parts. When required, these markings may be made visible to the proper authorities by viewing with an ultraviolet light source. A portable, battery powered device capable of producing such ultraviolet light will be made available to the authorities.

Once covered, an article can be partially or fully re-marked in case of accidental cosmetic damage which has destroyed a marked portion of the article.

FIGS. 3 and 4 are respectively front and side elevational views of one designed embodiment of a hand-held marking unit 34 having an operating trigger 38, four positioning rubber roller ball assemblies 40, a spray marking ink aperture 42, and a rotatable wheel turret 44 rotatable 90° as indicated by arrow 46 to assume either a horizontal direction marking motion as shown in FIG. 3 or a vertical direction marking motion. The wheel turret includes a rotatable encoder wheel 48 for measuring movements of the marking unit along a surface to be marked. The encoder wheel 48 is mechanically coupled to an encoder for generating encoder rotational electrical signals which are directed to the local computer for controlling operation of the ink jet which sprays the marking characters onto the surface, all under control of the computer. The positions of the top roller ball assemblies 40 can be adjusted vertically, as illustrated schematically in FIGS. 3 and 4, or alternatively might be nonadjustable in other embodiments. The hand-held marking unit 34 is coupled by the conduit 32 to the codebox unit 30 as shown in FIG. 2, and the codebox unit 30 is coupled to the local computer by electrical cable 36 which can be fitted with a standard RS232 coupling. The codebox unit 30 includes a reservoir for the marking ink and electronics to run the marking unit, such that the conduit supplies marking ink to the marking unit therethrough, and electrical control signals are supplied in both directions through the conduit 32.

Figure 5:
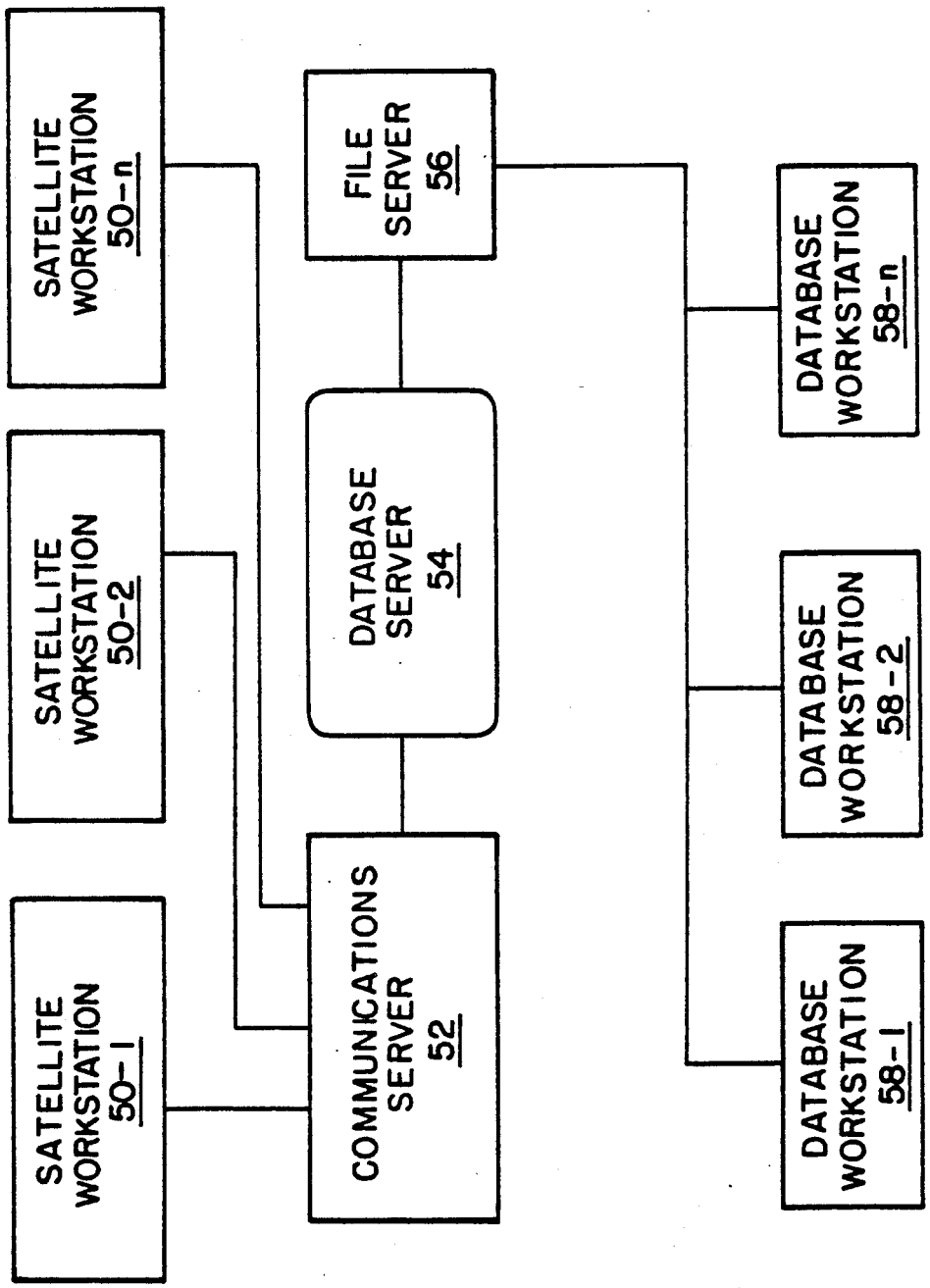
FIG. 5 illustrates a block diagram of the flow of data in the security method of the present invention.

FIG. 5 illustrates a block diagram of the flow of data in the security method of the present invention. A plurality of satellite workstations 50, one at each dealer/installer, might include any number n of satellite workstations having equipment similar to that as shown in FIGS. 1-4. Typically, each satellite workstation includes a computer such as an IBM 286 or an IBM clone, a color monitor, a codebox unit such as shown in FIG. 2 connected to a hand-held marking unit such as illustrated in FIGS. 3 and 4, and a modem to communicate with a modem in a communications server 52 at a central nationwide office. In one preferred mode of operation, communications between each satellite workstation 50 and the central office is on a store and forward basis, in which the central office accesses each satellite workstation one at a time when communications rates are low such as late at night. Software in the computer at the dealer/installer implements the creation of the covert security code number, random locations to mark, control of the hand-held marking head and electronic housekeeping functions to discreetly store, forward and purge the customer information and security codes.

In one alternative embodiment, the software can include a routine which randomly instructs the printing head to make some of the intended markings on a given article as "phantom" markings. In this way, the installer never knows which of the marking sites are real and which (if any) are just decoys. This makes it even more impossible for a potential thief to obtain accurate and reliable information on any given vehicle regarding exactly where the item is truly marked.

The central office includes the communications server 52 which performs modem functions, a database server 54 such as an IBM 486 computer or clone which stores all necessary data in a permanent memory such as, for an automobile, the make, model and serial number of a car, information of the subscriber, the insurance carrier, the code marking, and the number and locations of all code markings. A file server 56 can be a software module to provide access to all information stored in memory. A plurality of database workstations 58-1 to 58-n, which might be any number n, at the central office provide service and access to the information stored in memory to provide service to customers, insurance companies, and law enforcement agencies. Each database workstation typically includes a computer such as an IBM 286 or 386 or IBM clone. alternatively, one or more of the database workstations can be located noncentrally and communicate by a modem with the central office.

While several embodiments and variations of the present invention for a security method with applied invisible security code markings are described in detail herein, it should be apparent that the disclosure and teachings of the present invention will suggest many alternative designs to those skilled in the art.

What is claimed is:

1. A security method for applying invisible security markings to articles such as automobiles, boating equipment, objects of art and collectibles, comprising:
    a. supplying an installer of said security markings with equipment comprising a unit having a keyboard for data entry, a visual screen for monitoring the data entry procedure and for displaying information on the locations on an article where it is to be marked with invisible security markings, with the unit having a memory programmed with sets of many possible marking sites for different particular types of articles, portable and a hand-held marking device;
    b. recording and inputting data, with said unit, necessary to institute a subscription to the security method such as a subscriber's name and address, a description of the article to be protected, and the manufacturer serial number of the article;
    c. selecting different locations on the article to which invisible security markings are to be applied by reading from said memory a programmed set of possible marking locations for the particular type of article, with the number of locations and the particular selected locations being selected differently from article to article;
    d. instructing the installer on the precise locations where the article is to be marked by displaying information on those locations on the display screen;
    e. covertly selecting, without disclosure to either installer or subscriber, a unique and confidential registration code which is to be applied to all selected locations on the article;
    f. applying the registration code to the selected locations on the article with said hand-held marking device with markings which are invisible to the human eye; and
    g. transferring the subscriber information, confidential registration code, and locations of all invisible security markings to a limited-access central data base.

2. A security method as claimed in claim 1, further comprising erasing from the memory of the unit confidential information pertaining to the registration code and the precise locations where the registration code has been applied to the article.

3. A security method as claimed in claim 2, further comprising displaying to the installer on the visual screen of the unit, the position coordinates of each selected marking location, wherein the position coordinates are cross indexed to a master grid superimposed on an image of the article displayed on the visual display screen, to indicate the precise locations where the invisible security markings are to be applied.

4. A security method as claimed in claim 3, wherein said step of applying comprises applying the registration code with said portable hand-held marking device containing an electrostatic, noncontact ink jet spraying nozzle, wherein when the marking device is passed over the surface to be marked, the marking device prints the unique, confidential registration code in a dot matrix format of alphanumeric characters on the surface.

5. A security method as claimed in claim 4, further comprising applying the registration code with a clear, ethanol based ink, which, when applied, is invisible to the naked eye.

6. A security method as claimed in claim 5, including cooperating with authorities in any case of theft by providing authorities with the coordinates of all marked locations, as well as the unique registration code printed on the article, thereby allowing positive identification of a marked article or a marked part of an article.

7. A security method as claimed in claim 6, further comprising providing a portable battery powered illuminator which illuminates the invisible registration code markings with actinic radiation to render said markings visible to the human eye.

8. A security method as claimed in claim 7, further comprising placing a visible warning emblem on the article to alert a potential thief that the article is protected by a security system, and can be positively identified even if disassembled.

9. A security method as claimed in claim 7, wherein said selecting step si performed randomly, with the number of locations and the particular selected locations being selected randomly from article to article.

10. A security method as claimed in claim 1, further comprising displaying to the installer on the visual screen of the unit, the position coordinates of each selected marking location, wherein the position coordinates are cross indexed to a master grid superimposed on an image of the article displayed on the visual display screen, to indicate the precise locations where the invisible security markings are to be applied.

11. A security method as claimed in claim 1, wherein said portable hand-held marking device contains an electrostatic, noncontact ink jet spraying nozzle, wherein when the marking device is passed over the surface to be marked, the marking device invisibly prints the unique, confidential registration code in a dot matrix format of alphanumeric characters on the surface.

12. A security method as claimed in claim 11, further comprising applying the registration code with a clear, ethanol based ink, which, when applied is invisible to the naked eye.

13. A security method as claimed in claim 1, further including cooperating with authorities in any case of theft by providing authorities with the coordinates of all marked locations, as well as the unique registration code printed on the article, thereby allowing positive identification of a marked article or a marked part of an article.

14. A security method as claimed in claim 6, further comprising providing a portable battery powered illuminator which illuminates the invisible registration code markings with actinic radiation to render said markings visible to the human eye.

15. A security method as claimed in claim 1, further comprising placing a visible warning emblem on the article to alert a potential thief that the article is protected by a security system, and can be positively identified even if disassembled.

* * * * *

UNITED STATES PATENT AND TRADEMARK OFFICE
CERTIFICATE OF CORRECTION

PATENT NO. : 5,083,814
DATED : January 28, 1992
INVENTOR(S) : Robert R. Guinta, et al.

It is certified that error appears in the above-identified patent and that said Letters Patent is hereby corrected as shown below:

On the Title page,
item [57] In the Abstract, line 10: "form" should read as --from--

Column 2, line 42: "warninq" should read as --warning--

Column 7, line 45, Claim 1: "portable and a" should read as --and a portable--

Column 8, line 50, Claim 9: "si" should read as --is--

Column 9, line 3, Claim 12: after "applied" insert --,--

Signed and Sealed this

Twenty-fifth Day of May, 1993

Attest:

MICHAEL K. KIRK

Attesting Officer     Acting Commissioner of Patents and Trademarks